March 31, 1964  J. R. EISAN  3,127,187
ADJUSTABLE SPINDLES
Filed June 4, 1958  2 Sheets-Sheet 1

INVENTOR
JAMES R. EISAN
BY N. Vincent Hersha
ATTORNEY

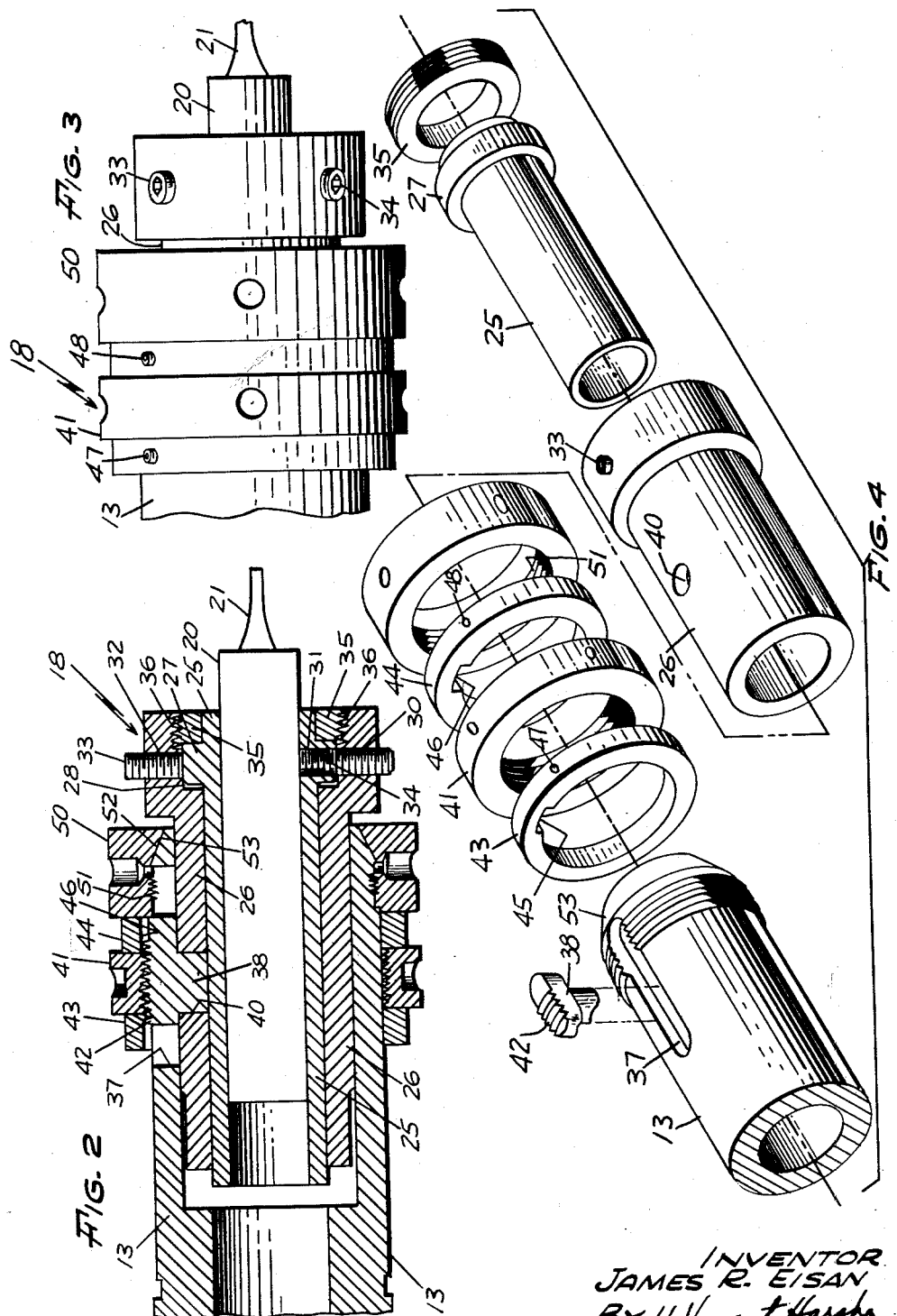

United States Patent Office 3,127,187
Patented Mar. 31, 1964

3,127,187
ADJUSTABLE SPINDLES
James R. Eisan, Natick, Mass., assignor to Raytheon Company, Lexington, Mass., a corporation of Delaware
Filed June 4, 1958, Ser. No. 739,746
2 Claims. (Cl. 279—83)

This invention relates to adjustable spindles and more particularly to spindles of the type adapted to hold a mandrel upon which a grid for an electron discharge device may be formed in a grid making machine.

In grid making machines and other applications where it is necessary to accurately center the mandrel in a spindle attached to a rotating shaft it is frequently necessary to shift the position of the mandrel axially. It is important that this be done without disturbing the centering of the mandrel with respect to the shaft. Usually when the spindle is loosened to shift the mandrel axially the centering adjustment is lost and much time is wasted in recovering it. Also because the operators of such machines know that the centering adjustment will require time and care they try to avoid the loosening of the mandrel in the spindle by seeking to achieve the same result by other means as by changing the tension on the material being wound on the mandrel. These other adjustments take time and may not achieve their purpose and the spindle will have to be loosened anyway with additional loss in time.

By the present invention the axial adjustment of the mandrel may be made without disturbing its centering. This is accomplished by mounting the arbor and mandrel in a sleeve by means of set screws which determine the centering of the mandrel. This sleeve is then mounted in a second closely fitting sleeve that is in turn mounted in an opening in the end of the shaft where it may be positioned axially by means of a pin passing through an axial slot formed in the shaft near the end and feeding into a hole in the outer sleeve. The pin is positioned axially on the shaft by means of collets and adjustable retaining means such as set screws. The arbor and mandrel when once centered by means of the retaining means may be readjusted axially merely by loosening the devices that hold the pin and outer sleeve within the opening in the shaft without disturbing the centering which is determined by the adjustable retaining means holding the arbor in the inner sleeve and the inner sleeve in the outer sleeve which need not be touched in only an axial adjustment is needed.

Other and further features and advantages will be apparent as the description progresses, reference being had to the accompanying drawings in which:

FIG. 2 is a sectional view of the arbor and spindle positioned within the shaft of the machine shown in FIG. 1;

FIG. 3 is a side view of the arbor and spindle shown in FIG. 2; and

FIG. 4 is an exploded view of the spindle and shaft of the invention.

Figure 1:
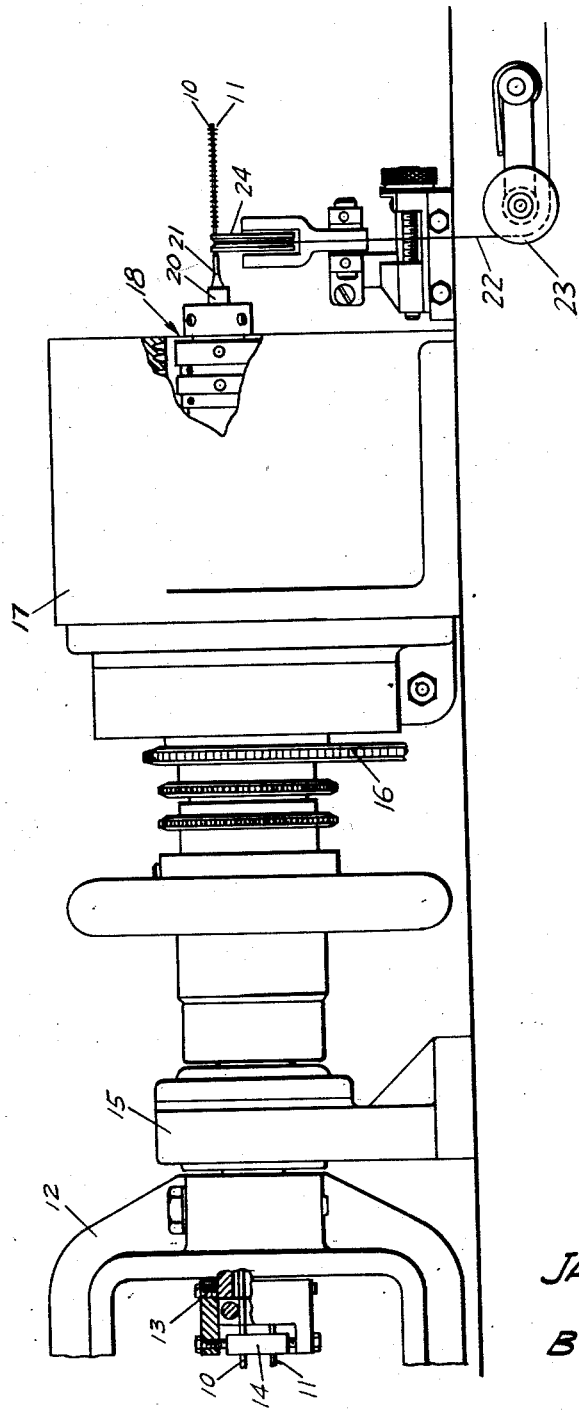
FIG. 1 is a side view partly in section of part of a grid making machine.

FIG. 1 shows the portions of a grid making machine of the type with which the spindle of the invention may be used. Patent No. 2,480,677, issued to W. L. Sheffield, fully discloses such a machine. Reference numerals 10 and 11 designate the two wires used to form the side rods of the grids made by the machine. These wires are fed from spools supported on yokes 12. The support wires 10 and 11 are fed into the hollow interior of the shaft 13 through a guide structure 14 and pulled through by any convenient means (not shown). The hollow shaft 13 is supported on bearing 15 and driven by a chain 16. The hollow shaft 13 is further supported and its rotation controlled by structures not shown contained in the casing 17. The shaft terminates in the spindle of the invention generally designated by the numeral 18 which holds the arbor 20 and mandrel 21. The grid strand wire 22 supplied from a reel not shown guided by pulleys 23 and 24 to be wound upon the side rods 10 and 11 and attached thereto by devices not shown but fully described in the cited patent to Sheffield. It can readily be seen that in such a machine the centering of the mandrel 21 must be accurately maintained if the grid strand wire is to be accurately wound on the side rods 10 and 11.

The construction of the spindle can best be seen by reference to FIGS. 2, 3 and 4 where the usually elliptical mandrel is designated by the reference numeral 21 and is supported in the arbor 20 which is in turn supported in the inner sleeve 25 of the spindle. This sleeve is in turn supported within an outer sleeve 26. The inner sleeve 25 is formed with an enlargement 27 near its outer end which fits into an enlarged portion 28 of the outer sleeve 26. Aligned threaded holes 30, 31 and 32 are formed in the enlarged outer portions of the sleeves 25 and 26 into which fit set screws 33 and 34. The adjustment of the set screw 34 provides lateral movement of the arbor 20 within the inner sleeve 25 and the adjustment of the set screw 33 provides lateral movement of the inner sleeve 25 within the outer sleeve 26. By appropriate adjustment of these set screws, the axis of the mandrel 21 may be aligned with the axis of the inner sleeve 25, the axis of which is also aligned with that of the outer sleeve 26. By this means, the inner sleeve 25 is positioned axially within the outer sleeve 26. It is retained in this position by means of a threaded collet 35 threaded on a portion 36 of the outer end of the outer sleeve 26 and against the enlarged portion 27 of the inner sleeve 25. The outer end of the shaft 13 is formed with an axial slot 37 formed to receive a pin 38, the lower end of which fits into an opening 40 in the outer sleeve 26. When the desired axial position of the outer sleeve 26 is attained, this position is retained by a threaded collet 41 adapted to be slipped over the shaft 13 and threaded onto a portion 42 of the pin 38. A pair of rings 43 and 44 provided with slots 45 and 46, respectively, which accommodate the top portion of the pin 38 are held in place by set screws 47 and 48. The spindle is finally clamped in position by means of a threaded collet 50 formed with a threaded portion 51 on the inside near its inner end which is threaded on a portion of the shaft near its outer end. The collet 50 is also formed with a tapered camming surface 52, which when pulled up against a taper 53 on the end of the shaft 13 by screwing the collet onto the threads 54 near the end of the shaft 13, tends to pull the end of the shaft down onto the spindle, holding it in position.

By the use of this spindle in a grid making machine, the operator may change the minor diameter grid size from one half thousandths to five thousandths of an inch in ten to fifteen minutes instead of requiring from forty-five minutes to an hour and a half as do conventional spindles. The accuracy to which the contacting surfaces of the inner and outer sleeves are machined determines the accuracy to which the centering of the spindle may be held while the axial position of the arbor is being adjusted. Accuracy of a ten thousandths of an inch may readily be obtained.

This completes the description of the embodiment of the invention illustrated herein. However, many modifications and advantages thereof will be apparent to persons skilled in the art without departing from the spirit and scope of this invention. Accordingly, it is desired that this invention will not be limited to the particular details of the embodiment disclosed herein except as defined by the appended claims.

What is claimed is:

1. An adjustable spindle comprising inner and outer concentric sleeves with the inner sleeve dimensioned to receive a mandrel, locking means cooperative with said sleeves for maintaining said mandrel in a preselected stationary position with respect to said inner and outer sleeves, a shaft formed with an axial opening in one end dimensioned to receive the outer sleeve and having adjustable means for axial location of the sleeves within the opening without disturbing the preselected position of said mandrel comprising a slot in said shaft in the region of the opening and extending parallel with the longitudinal axis of the shaft, a hole in the outer sleeve radially aligned with said slot, a pin extending through said slot into the hole in the outer sleeve, and means to hold the pin in adjusted position within the slot, said means comprising a collet extending circumferentially of the shaft and over the pin, and ring members on either side of the collet removably fixed to the shaft for retaining the collet in position over the pin.

2. An adjustable spindle structure for use in making grids for electron discharge devices, said structure comprising inner and outer sleeves dimensioned to receive a mandrel adjustable locking means cooperative with said sleeves whereby said mandrel may be axially centered in a preselected stationary position with respect to said inner and outer sleeves, said inner and outer sleeves being further positioned within a shaft, means for adjusting the axial position of said mandrel with respect to said shaft without disturbing the preselected position of said mandrel with respect to said sleeves comprising a pin passing through an opening in said shaft and engaging a reception area in said outer sleeve, said pin having a threaded head, a threaded member having a threaded portion engaging the threaded head portion of said pin whereby said pin and, consequently, said outer and inner sleeves may be moved axially along said shaft, and locking members on either side of the threaded member and removably fixed to the shaft for retaining the threaded member and consequently the pin and sleeves in adjusted positions.

References Cited in the file of this patent
UNITED STATES PATENTS

| | | |
|---|---|---|
| 647,644 | Blount | Apr. 17, 1900 |
| 1,814,770 | Schenk et al. | July 14, 1931 |
| 1,893,958 | Parten | Jan. 10, 1933 |
| 1,994,307 | Flaws | Mar. 12, 1935 |
| 2,435,396 | Koch | Feb. 3, 1948 |
| 2,439,272 | Sholtis et al. | Apr. 6, 1948 |
| 2,441,228 | Schneider et al. | May 11, 1948 |
| 2,564,460 | Blanco | Aug. 14, 1951 |
| 2,872,949 | Reiter et al. | Feb. 10, 1959 |
| 2,905,490 | Trandel | Sept. 22, 1959 |